United States Patent
Sakaguchi et al.

(10) Patent No.: US 6,320,010 B1
(45) Date of Patent: Nov. 20, 2001

(54) CURABLE COMPOSITION

(75) Inventors: Masashi Sakaguchi, Kakogawa; Yoshimichi Yamanaka, Toyonaka; Hidenari Tsunemi, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/462,904

(22) PCT Filed: May 20, 1999

(86) PCT No.: PCT/JP99/02663

§ 371 Date: Mar. 27, 2000

§ 102(e) Date: Mar. 27, 2000

(87) PCT Pub. No.: WO99/60063

PCT Pub. Date: Nov. 25, 1999

(30) Foreign Application Priority Data

May 20, 1998 (JP) .................................. 10-138453

(51) Int. Cl.[7] ..................................... C08G 77/20
(52) U.S. Cl. ............... 528/25; 525/100; 525/101; 525/105; 528/15; 528/31
(58) Field of Search .................. 525/100, 101, 525/105, 342; 528/15, 25, 31

(56) References Cited

U.S. PATENT DOCUMENTS 5,225,511 * 7/1993 Durfee .
5,451,637 * 9/1995 Leibfried .
6,087,456 * 7/2000 Sakaguchi et al. .

* cited by examiner

Primary Examiner—Robert Dawson
Assistant Examiner—Marc S. Zimmer
(74) Attorney, Agent, or Firm—Connolly Bove Lodge & Hutz

(57) ABSTRACT

By incorporating
(A) a saturated hydrocarbon polymer having more than one alkenyl group capable of being hydrosilylated in each molecule and having a molecular weight of 2,000 to 50,000,
(B) a component comprising a compound containing more than two silicon atom-bound hydrogen atoms, on average, in each molecule,
(C) a compound having, within the molecule, one alkenyl group capable of being hydrosilylated,
(D) a compound having, within the molecule, at least two alkenyl groups capable of being hydrosilylated and having a molecular weight less than 2,000, and
(E) a hydrosilylation catalyst, a composition having good mechanical characteristics, a high gel fraction and a small heating loss can be obtained. As a result, the invention can provide a composition to secure the uniformity within a wide range of selection not depending on its viscosity, because it is markedly relaxed the restriction on SiH-containing compounds that are curing agents possibly becoming a cause of said insufficient curing.

20 Claims, No Drawings

CURABLE COMPOSITION

TECHNICAL FIELD

The present invention relates to a curable composition and, more particularly, to a curable composition which comprises a saturated hydrocarbon polymer and a silyl group-containing compound, occurs as a liquid in an uncured state and, when cured, gives a rubber-like elastomer having good heat resistance, weathering resistance, water resistance, chemical resistance and other durability characteristics. Its field of application includes sealants for electric and electronic devices or parts, sealing materials for various batteries or cells and condensers, sealers or sealants for various parts for coping with high frequency waves, various coating materials, gasket materials, sealing agents, molding materials, paints, adhesives, tackifiers, impression materials, textile treatment agents, impregnating resins for printed circuit boards, materials for built-up type circuit boards and the like.

BACKGROUND ART

Various curable liquid materials, such as silicones, urethanes and epoxy resins, have so far been widely used in the fields of not only rubber molding but also coating agents, potting agents, dipping agents and the like, making the best use of their characteristic features, for example their being liquid rubbers.

Among them, silicones are widely used as materials having high heat resistance, weathering resistance and reliability, among others, in various fields. In particular, those having a low viscosity and fluidity before curing are used as potting agents or like sealers in the field of electronics. Urethane resins, which are characterized by their high strength owing to the cohesive force of crosslinks and their water resistance and heat resistance owing to the main chain skeleton such as hydrogenated polybutadiene, are used not only in the field of electronics but also for waterproof coating. Epoxy resins, which are excellent in adhesiveness and heat resistance and are high strength materials, are used especially as sealers for semiconductor devices in the field of electronics and in other fields.

However, silicones have problems; for example, they show high permeability, have poor adhesiveness and are expensive. The problems which urethane resins have are, for example, that their electric characteristics lower upon moisture absorption and that they are inferior in heat resistance to silicones and epoxy resins. Epoxy resins are high in elasticity modulus, weak to cold and hot impact and inferior in insulating property to silicone resin. In the case of urethane resins and epoxy resins, the human toxicity of starting oligomers has become an issue.

On the other hand, curable materials comprising, as essential constituents, three components, namely an alkenyl-containing saturated hydrocarbon polymer (hereinafter referred to as main component), a hydrosilyl-containing curing agent and a hydrosilylation catalyst, have been developed as materials having other characteristic features than those of the above-mentioned materials. They are expected to be useful in various fields of application in which their high heat resistance, weathering resistance, water resistance and insulating properties, among others, can be made efficient use of.

However, the main component of this curable materials is a polymer, so that compositions based thereon, in an uncured state, may have a very high viscosity depending on the main component species. In particular when an isobutylene polymer is used as the main component, it is difficult to handle the isobutylene polymer as a liquid because of its high viscosity without applying some viscosity reducing technology, although the cured products obtained are excellent in various durability characteristics and, further, have low permeability and good vibration damping properties. Thus, for utilizing such curable compositions as potting agents or coating materials, it is essential to secure fluidity by some or other viscosity reducing technology. The most general technique as such viscosity reducing technology is the addition of a nonreactive diluent generally called plasticizer, for example an oil. In that case, however, while the viscosity is reduced by the addition of the plasticizer, the mechanical strength is markedly lowered and evaporation of the plasticizer at elevated temperatures causes heating loss and volume reduction of cured products, leading to marked changes in mechanical characteristics and, further, induces blooming of the plasticizer; reliability reduction thus results.

For solving such problems, a method has been proposed which comprises using in addition to the above three components, an organic compound containing, within the molecule, at least one alkenyl or alkynyl group capable of being hydrosilylated, combinedly as a fourth component. The designing of this method is that silicon atom-bound hydrogens of the curing agent, which are to serve as crosslinking sites, react with alkenyl-containing polymer, which constitute the main component, to form network chains and, at the same time, the fourth component, namely diluent itself is integrated into the crosslinked structure by reacting with such silicon atom-bound hydrogen atoms. For the formation of such crosslinked structure, it is essential that the network chain-forming polymer have crosslinking sites, namely bind to at least two curing agent molecules. The fourth component is integrated into the network structure by reacting with the remaining silicon atom-bound hydrogen atoms in the curing agent. Therefore, the addition amount of the fourth component is restricted by the number of silicon atom-bound hydrogen atoms in the curing agent. In other words, for incorporating the fourth component in a large amount, it is necessary to use a curing agent containing a large number of silicon atom-bound hydrogen atoms in each molecule. In this case, however, it is difficult to secure sufficient compatibility between the main component saturated hydrocarbon polymer and the curing agent. In particular, in compositions having a low viscosity and susceptible to phase separation, homogeneously cured products can hardly be obtained. To surmount these problems, improvements are to be brought about.

The present invention is to provide a curable composition which has a low viscosity in an uncured state and, in a wide viscosity range, gives a homogeneous rubber-like elastomer excellent in heat resistance, weathering resistance, water resistance, chemical resistance and other durability characteristics and in mechanical strength, and which could have never been attained by the prior art viscosity reducing technology.

SUMMARY OF THE INVENTION

The present inventors found that when, in curable materials comprising, as essential components, three components, namely an alkenyl-containing saturated hydrocarbon polymer (hereinafter referred as to main component), a hydrosilyl-containing curing agent and a hydrosilylation catalyst, a compound containing at least two alkenyl groups within the molecule is combinedly used with a compound containing one alkenyl group within the molecule as the diluent, the resulting composition has a low viscosity in an uncured state and, in a wide viscosity range, gives a homogeneous rubber-like elastomer excellent in heat resistance, weathering resistance, water resistance, chemical resistance and other durability characteristics and in mechanical strength.

Thus, the present invention provides a curable composition which comprises:
(A) a saturated hydrocarbon polymer having more than one alkenyl group capable of being hydrosilylated, on average, in 35 each molecule and having a molecular weight of 2,000 to 50,000,
(B) a component comprising a compound containing more than two silicon atom-bound hydrogen atoms, on average, in each molecule,
(C) a compound having, within the molecule, one alkenyl group capable of being hydrosilylated,
(D) a compound having, within the molecule, at least two alkenyl groups capable of being hydrosilylated and having a molecular weight less than 2,000, and
(E) a hydrosilylation catalyst.

DETAILED DESCRIPTION OF THE INVENTION

The component (A) to be used in the present invention is a saturated hydrocarbon polymer having more than one alkenyl groups capable of being hydrosilylated in each molecule and having a molecular weight of 2,000 to 50,000. The saturated hydrocarbon polymer as so referred to herein includes, within the meaning thereof, polymers containing substantially no carbon-carbon unsaturated bond other than an aromatic ring except for the alkenyl groups, with the repeating unit(s) constituting the main chain, exclusive of said alkenyl groups, being a hydrocarbon group(s). The alkenyl group capable of being hydrosilylated is not particularly restricted but may be any carbon-carbon double bond-containing group that is active in the hydrosilylation reaction. As said alkenyl group, there can be mentioned aliphatic unsaturated hydrocarbon groups such as vinyl, allyl, methylvinyl, propenyl, butenyl, pentenyl and hexenyl, and cyclic unsaturated hydrocarbon groups such as cyclopropenyl, cyclobutenyl, cyclopentenyl and cyclohexenyl.

In the practice of the present invention, the component (A) preferably have such hydrosilylatable alkenyl groups at the polymer termini. The case of the hydrosilylatable alkenyl groups being at the polymer termini is preferable, because the finally formed cured products favorably have a greater number of effective network chains so that rubber-like cured products with high strength and high elongation can readily be obtained.

The polymer constituting the skeleton of the (A) component saturated hydrocarbon polymer can be obtained, for instance, by (1) polymerizing an olefin compound containing 2 to 6 carbon atoms, such as ethylene, propylene, 1-butene or isobutylene, as the main monomer, or (2) homopolymerizing a diene compound such as butadiene or isoprene, or copolymerizing such olefin compound with such diene compound, and then hydrogenating the resulting (co)polymer. From the viewpoint of ease of terminal functional group introduction, ease of molecular weight control and possibility of introducing an increased number of terminal functional groups, isobutylene polymers, hydrogenated polybutadiene polymers and hydrogenated polyisoprene polymers are preferred.

Said isobutylene polymers may be composed of isobutylene units alone as monomer units or may contain other monomer units copolymerizable with isobutylene preferably in a proportion of not more than 50% (% by weight; hereinafter the same shall apply), more preferably not more than 30%, particularly preferably not more than 20%, in the isobutylene polymer.

As the monomer component, there may be mentioned, among others, olefins containing 4 to 12 carbon atoms, vinyl ethers, aromatic vinyl compounds, vinylsilanes and allylsilanes. As specific examples of such coplymer components, there may be mentioned 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-alloyloxystyrene, p-hydroxystyrene, β-pinene, indene, vinyldimethylmethoxysilane, vinyltrimethylsilane, divinyldimethoxysilane, divinyldimethylsilane, 1,3-divinyl-1,1,3,3-tetravinylsilane trivinylmethylsilane, tetravinylsilane, allyldimethylmethoxysilane, allyltrimethylsilane, diallyldimethoxysilane, diallyldimethylsilane, γ-methacryloyloxypropyl-trimethoxysilane, γ-methacryloyloxypropylmethyl-dimethoxysilane, and the like.

The above-mentioned hydrogenated polybutadiene polymers and other saturated hydrocarbon polymers may contain, like in the case of the above isobutylene polymers, other monomer units in addition to the main component monomer units.

The saturated hydrocarbon polymer to be used as component (A) in the present invention may contain monomer units capable of leaving a double bond after polymerization, such as monomer units derived from a polyene compound such as butadiene, isoprene, 1,13-tetradecadiene, 1,9-decadiene, 1,7-octadiene or 1,5-hexadiene, in a small amount, preferably in an amount not more than 10%, with the condition that the object of the present invention can still be accomplished.

The number average molecular weight (GPC method, in terms of polystyrene equivalent) of said saturated hydrocarbon polymer, preferably an isobutylene polymer, hydrogenated polyisoprene or hydrogenated polybutadiene, is preferably about 2,000 to 50,000, in view of ease in handling and rubber elasticity after curing. In the present invention, the simple term "molecular weight" is sometimes used as a term indicating "number average molecular weight".

As the production method for the (A) component to be used in accordance with the present invention, there maybe mentioned the method comprising reacting a polymer having a functional group, such as hydroxy, with an unsaturated group-containing compound to thereby introduce said unsaturated group into said polymer, as disclosed in Japanese Kokai Publication Hei-03-152164 and Japanese Kokai Publication Hei-07-304909. Further, for introducing an unsaturated group into a halogen atom-containing polymer the method involving the Friedel-Crafts reaction with an alkenyl phenyl ether, the method involving the substitution reaction with allyltrimethylsilane or the like in the presence of a Lewis acid and the method comprising carrying out the Friedel-Crafts reaction with a phenol for hydroxy group introduction and then combinedly applying the above-mentioned alkenyl group introduction method, among others. Furthermore, it is also possible to effect unsaturated group introduction in the step of monomer polymerization, as disclosed in U.S. Pat. No. 4,316,973, Japanese Kokai Publication Sho-63-105005 and Japanese Kokai Publication Hei-04-288309.

The curing agent as the (B) component in the present invention is not restricted but may be any compound containing more than two silicon atom-bound hydrogen atoms, on average, in each molecule. In cases where two hydrogen atoms are bound to one silicon atom, the number of silicon atom-bound hydrogen atoms is regarded as 2.

As the (B) component, a polyorganohydrogensiloxane is preferable. The term polyorganohydrogensiloxane as used herein indicates a siloxane compound having a hydrocarbon group(s) and/or hydrogen atom(s) on each silicon atom. As specific examples of such structure, there may be mentioned linear or cyclic structures such as:

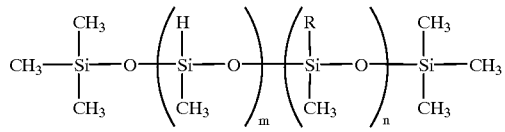

($2 \leq m+n \leq 50, 2<m, 0 \leq n$, and R being a hydrocarbon group whose main chain contains 2 to 20 carbon atoms and which may contain one or more phenyl groups)

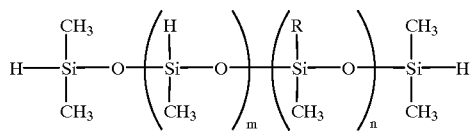

($0 \leq m+n \leq 50, 0<m, 0 \leq n$, and R being a hydrocarbon group whose main chain contains 2 to 20 carbon atoms and which may contain one or more phenyl groups)

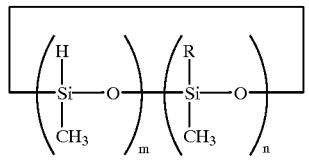

($3 \leq m+n \leq 20, 2<m \leq 19, 0 \leq n<18$, and R being a hydrocarbon group whose main chain contains 2 to 20 carbon atoms and which may contain one or more phenyl groups); and structures having two or more of such units, such as

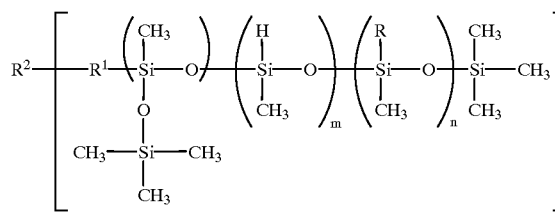

($1 \leq m+n \leq 50, 1<m, 0 \leq n$, and R being a hydrocarbon group whose main chain contains 2 to 20 carbon atoms and which may contain one or more phenyl groups, $2 \leq 1, R^2$ being a divalent to tetravalent organic group, $R^1$ being a divalent organic group $R^1$ may be absent according to the structure of $R^2$);

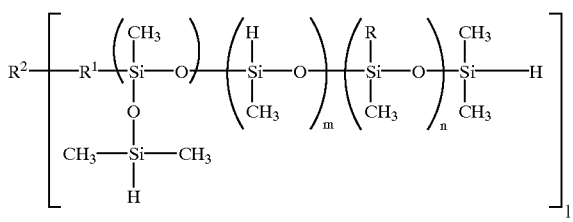

($0 \leq m+n \leq 50, 0<m, 0 \leq n$, and R being a hydrocarbon group whose main chain contains 2 to 20 carbon atoms and which may contain one or more phenyl groups, $2 \leq 1, R^2$ being a divalent to tetravalent organic group; $R^1$ being a divalent organic group $R^1$ may be absent according to the structure of $R^2$);

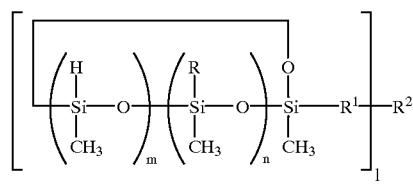

($3 \leq m+n \leq 50, 1<m, 0 \leq n$, and R being a hydrocarbon group whose main chain contains 2 to 20 carbon atoms and which may contain one or more phenyl groups, $2 \leq 1, R^2$ being a divalent to tetravalent organic group; $R^1$ being a divalent organic group; $R^1$ may be absent according to the structure of $R^2$);

In using such (B) component, it is necessary to take into consideration the compatibility with each of the (A), (C) and (D) components and/or the dispersion stability in the system. In particular when the (B) component poorly compatible with the above respective components is used in a system having, as a whole, a low viscosity, phase separation may possibly occur and insufficient cure may result. In selecting the (B) component, it is required that said component have good compatibility especially with the (A) component or show good dispersion stability. In cases where a filler having a small particle size, such as finely divided silica, is incorporated, however, it serves as a dispersing agent and makes it possible to obtain a homogeneous cured product.

As specific examples which have good compatibility with component (A) or show good dispersion stability, there may be mentioned, among others.

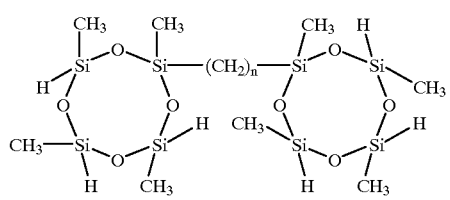

(n being 6 or 8)

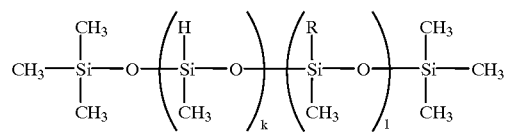

($2<k<10, 0<1<5$, and R being a hydrocarbon group containing not less than 8 carbon atoms)

In the present invention, the (B) component is used preferably in an amount such that the total amount of silicon atom-bound hydrogen atoms in component (B) amounts to 0.8 to 5.0 equivalents in mole ratio relative to the total amount of hydrosilylatable alkenyl groups in components (A), (C) and (D). When the total amount of silicon atom-bound hydrogen atoms in component (B) amounts to less than 0.8 equivalent in mole ratio relative to the total amount of hydrosilylatable alkenyl groups in components (A), (C) and (D), insufficient crosslinking will result. When it is in excess of 5.0 equivalents, a problem may arise; namely, the physical properties may be markedly affected by the silicon atom-bound hydrogen atoms remaining after curing. Especially when this influence is to be suppressed, it is preferred that the (B) component be used in an amount, in mole ratio, of 1.0 to 2.0 equivalents, more preferably 1.0 to 1.5 equivalents.

The (C) component in the present invention, namely the compound having one hydrosilylatable alkenyl group within the molecule serves as a diluent for reducing the viscosity of the system as a whole before curing and, after curing by the hydrosilylation reaction with the (B) component which provides crosslinking sites, it is integrated into the crosslink structure. This (C) component is required to have 1) good compatibility with component (A), 2) a low viscosity, 3) a low volatile matter content under curing conditions and 4) activity in the hydrosilylation reaction. Thus, it is particularly preferred that the (C) component be a hydrocarbon compound having low polarity so as to meet requirement 1), that it have a molecular weight of not more than 400 to meet requirement 2), that it be a compound containing not less than 8 carbon atoms to meet requirement 3) and that the alkenyl group be an α-olefin to meet requirement 4). As specific examples of such (C) component thus include, but are not limited to, $C_6$ to $C_{20}$, preferably $C_8$ to $C_{18}$ α-olefins, styrene, α-methylstyrene, α-methylstyrene dimer, allylcyclopentane and vinylcyclohexane. Generally, the (C) component is used in an amount of 1 to 200 parts by weight, preferably 5 to 150parts by weight, more preferably 10 to 100 parts by weight, per 100 parts by weight of the (A) component. When its amount is less than 10 parts, the effect will be insufficient to attain the original purpose of viscosity reduction. When it is in excess of 100 parts by weight, it is difficult to obtain cured products with a high gel fraction.

The (D) component in the present invention, namely the compound having at least two hydrosilylatable alkenyl groups within the molecule and having a molecular weight less than 2,000, upon hydrosilylation with the (B) component, increases the number of functional groups on crosslinking sites and, as a result, contributes to raise the addition amount of the (C) component which is to serve as a diluent. Since this (D) component, when incorporated in a large amount, causes an increase in modulus of elasticity in tension in the cured products and renders said products hard and brittle, the optimal addition amount thereof is relatively low. Therefore, the compatibility with component (A) as required of the (C) component or the viscosity of the (D) component itself is not so important. However, like component (C), it is still required that 1) a nonvolatile matter content be low under curing conditions and 2) be active in the hydrosilylation reaction. On the other hand, the number of alkenyl groups is not particularly restricted if it is not less than 2. Even if it may be 3, 4 or, further, 10 or more as in the case of 1,2-vinyl moieties in polybutadiene, the intended object can be attained.

Specific examples of the (D) component include, but are not limited to, difunctional ones such as tetramethyldivinylsiloxane, bisphenol A allyl ether, 1,7-octadiene, 1,9-decadiene, pentaerythritol diallyl ether, divinylbenzene and trimethylolpropane diallyl ether, trifunctional ones such as trimethyltrivinylcyclosiloxane, triallyl trimellitate, pentaerythritol triallyl ether and 1,2,4-trivinylcyclosiloxane, tetrafunctional ones such as tetramethyltetravinylcyclosiloxane, and polyfunctional ones such as 1,2-polybutadiene oligomers.

Generally, the (D) component is used in an amount of 0.5 to 50 parts by weight, preferably 1 to 30 parts by weight, more preferably 2 parts by weight to 20 parts by weight, per 100 parts by weight of the (A) component. When the addition amount is below 0.5 part by weight, the original object of component (D) to increase the number of functional groups at crosslinking sites can hardly be achieved and, depending on the addition amount of component (C), only insufficiently cured products with a low gel fraction may be obtained. When it is above 50 parts by weight, the cured products obtained will be hard and brittle and poor in rubber elasticity.

The (E) component in the present invention, namely the hydrosilylation catalyst is not particularly restricted but any arbitrarily selected one may be used.

Specific examples are chloroplatinic acid, elementary platinum, solid platinum supported on a carrier such as alumina, silica or carbon black; platinum-vinylsiloxane complexes {e.g. $Pt_n(ViMe_2SiOSiMe_2Vi)_n$, $Pt[(MeViSiO)_4]_m$}; platinum-phosphine complexes {e.g. $Pt(PPh_3)_4$, $Pt(PBU_3)_4$}; platinum-phosphite complexes {e.g. $Pt[P(OPh)_3]_4$, $Pt[P(OBu)_3]_4$} (in the above formulas, Me stands for methyl, Bu for butyl, Vi for vinyl, Ph for phenyl, and n and m each represents an integer); $Pt(acac)_2$; and platinum-hydrocarbon conjugates described by Ashby et al. in U.S. Pat. Nos. 3,159,601 and 3,159,662 as well as platinum alcoholates described by Lamoreaux et al. in U.S. Pat. No. 3,220,972.

As examples of the catalyst other than platinum compounds, there may be mentioned $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, etc. These catalysts may be used singly or two or more of them may be used in combination. From the viewpoint of catalytic activity, chloroplatinic acid, platinum-olefin complexes, platinum-vinylsiloxane complexes, $Pt(acac)_2$ and the like are preferred. The amount of the catalyst is not particularly restricted but the catalyst is preferably used in an amount within the range of $10^{-1}$ to $10^{-8}$ moles, more preferably $10^{-2}$ to $10^{-6}$ moles, per mole of the alkenyl group in component (A). Hydrosilylation catalysts are generally expensive and corrosive and, in some instances, they induce generation of hydrogen gas in large amount to thereby cause foaming of cured products. Therefore, it is recommended that their use in an amount of not less than $10^{-1}$ moles be avoided.

According to the present invention, the curable composition is cured through the addition reaction of Si-H groups to alkenyl groups in the presence of a noble metal catalyst. Therefore, the rate of curing is very fast, which is favorable for line production systems.

For the purpose of improving the storage stability, a storage stability improving agent may be added to the curable composition of the present invention. Said storage stability improving agent is not particularly restricted but may be any of those ordinary stabilizers which are known as storage stabilizers for the (B) component in the present invention and capable of producing the desired effects. Specifically, compounds containing an aliphatic unsaturated bond, organic phosphorus compounds, organic sulfur compounds, nitrogen-containing compounds, tin compounds, organic peroxides and so on. More specifically, said agent includes, but is not limited to, 2-benzothiazolyl sulfide, benzothiazole, thiazole, dimethyl acetylenedicarboxylate, diethyl acetylenedi-carboxylate, BHT, butylhydroxyanisole, vitamin E, 2-(4-morpholinyldithio)benzothiazole, 3-methyl-1-buten-3-ol, acetylenically unsaturated group-containing organosiloxanes, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like.

Further, it is possible to add one or more of various inorganic fillers to the curable composition of the present invention according to need. As the inorganic fillers, there may be mentioned calcium carbonate, talc, silica, carbon black and other ordinary inorganic fillers. Since the curable composition of the present invention is formed by crosslinking due to the hydrosilylation reaction, however, influences on the hydrosilylation reaction should be taken into consideration in using such a filler. Thus, for instance, if the filler has a high content of absorbed moisture, said moisture will react with the (B) component, inducing foaming in the step of curing. When the filler contains a component capable of interfering the hydrosilylation reaction, for example a nitrogen and/or sulfur atom, markedly reduction in curability or insufficient curing may possibly result. It has been confirmed that some fillers greatly influence on the storage stability of the curable composition. In using such an inorganic filler, it is important to confirm the influence of the inorganic filler on the curability and/or storage stability beforehand.

In the curable composition of the present invention, there may be incorporated one or more of antioxidants, ultraviolet absorbers, pigments, surfactants and other additives each in an appropriate amount. In using these as well, the influence on the hydrosilylation reaction should be taken into consideration, like in the above-mentioned case of inorganic fillers.

In the curable composition of the present invention, there may further be incorporated one or more of various silane coupling agents for the purpose of providing adhesiveness. In particular, silane coupling agents having a function group such as an epoxy, methacryloyl or vinyl group have little influence on the curability and are highly effective in providing adhesiveness and easy to use. Useful silane coupling agents are not limited to these, however.

For preparing the curable composition of the present invention, various mixing apparatus in conventional use can be used. In cases where a component insoluble in the composition, typically an inorganic filler, is used, however, the mixing is preferably performed in an apparatus capable of causing uniform dispersion under shear force, for example a twin-screw mixer or a roll. In using the thus-obtained composition, the composition is deaerated using any of various deaeration apparatus and then subjected to casting, dipping, potting, coating or some other process.

According to the present invention, the composition, which has fluidity and a low viscosity of scores of poises before curing, can be cured in several minutes at 100° C. to give a rubber-like elastomer having a sufficient degree of crosslinking as evidenced by a high gel fraction not lower than 80% and only a several percent amount of heating loss at 150° C. for a week. Further, in the case employing the composition which has, not only fluidity, but relatively high viscosity such that a liquid injection molding system can be widely used as means of molding silicones, it is possible to obtain a rubber-like elastomer having sufficiently high strength characteristics, as evidenced, for example, by its strength at break of not less than 60 kgf/cm$^2$.

In addition to such good workability of the composition of the present invention, the use of a saturated hydrocarbon polymer as component (A) results in providing rubber-like elastomers excellent in heat resistance, weathering resistance, water resistance, chemical resistance and insulating property and capable of being used in a wide range of applications. Furthermore, by using an isobutylene polymer as component (A), it is possible to obtain rubber-like elastomers excellent not only in the above characteristics but also in low permeability, low moisture absorption, low gas permeability and vibration-damping property and suited for use as various molding materials, for example sealing materials for electric and electronic parts and the like, sealers for various types of cells or batteries and condensers, materials for various anti-high frequence parts, various coating materials, gasket materials, sealants and rubber products for medical use, and as paints, adhesives, impression materials, and so forth.

BEST MODES FOR CARRYING OUT THE INVENTION

The following examples illustrate the present invention in further detail. They are, however, by no means limitative of the scope of the present invention. In the following examples, the molecular weight of and the number of terminal functional groups in each compound A were determined by GPC and $^1$H-NMR, respectively.

GPC analysis: System: Waters system (pump 600E, differential refractometer 401); column: Showa Denko Shodex K-804; mobile phase: chloroform; the number average molecular weight or the like being expressed in terms of polystyrene equivalent.

$^1$H-NMR: Varian Gemini-300; measurement solvent: carbon tetrachloride/deuterated acetone mixed solvent.

For evaluating physical properties of the curable compositions, the viscosity of the composition before curing, the tensile characteristics and gel fraction after curing and, further, the heating loss after 1 week exposure in a hot air drier at 150° C. were measured.

Composition viscosity measurement: The composition was prepared by mixing, then deaerated and subjected to viscosity measurement using a type E viscometer at a temperature of 23° C. and a velocity of 5 rpm. For compositions containing an inorganic filler, they were relatively compared with respect to workability on the occasion of pouring them into molds in producing cured products.

Tensile characteristics measurement: Sheet-shaped cured products were punched by means of a die for No. 2(⅓) dumbbell specimens (hereinafter, "minidumbbells") and the minidumbbells were subjected to tensile characteristics measurement on a Shimadzu autograph AG-2000A in a constant temperature room maintained at 23° C. and 65±5% relative humidity under the conditions: pulling rate is 200 mm/min, chuck-to-chuck distance is 20 mm.

Gel fraction measurement: Fragments are cut out from each sheet-shaped cured product and placed in a wire gauze bag tared in advance (W1), and the whole is again weighed (W2). This is immersed in toluene at room temperature for 2 days and then dried in a hot air drier at 80° C. for 3 hours. This is weighed (W3). The gel fraction, which is the percentage by weight of the matter insoluble in toluene, is calculated as follows:

$$\text{Gel fraction } (\%) = (W3-W1)/(W2-W1) \times 100 \qquad \text{Formula (1)}$$

Heating loss measurement: The minidumbbells prepared for tensile characteristics measurement are weighed (W4), and put side by side on a teflon sheet spread on a metal vat. The whole is placed in a hot air drier at 150° C. and, one week later, taken out and cooling to the room temperature to be weighed (W5). The heating loss is calculated as follows:

$$\text{Heating loss } (\%) = 100 - W5/W4 \times 100 \qquad \text{Formula (2)}$$

EXAMPLE 1

Compound A1, which is an (A) component and has the structure shown below, was synthesized by the method described in Japanese Kokai Publication Sho-63-105005. (The analytical results are shown in Table 1).

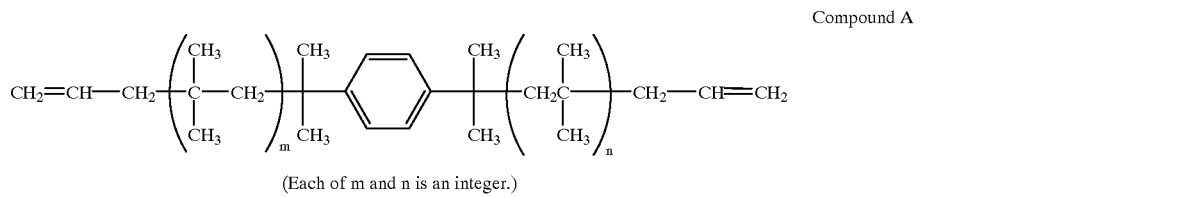

Compound A (Each of m and n is an integer.)

TABLE 1

| Item | Method | Analytical value | |
|---|---|---|---|
| | | Compound A1 | Compound A2 |
| Number average molecular weight (Mn) | GPC | 5200 | 10000 |
| Weight average molecular weight (Mw) | GPC | 6800 | 12300 |
| Molecular weight distribution | GPC | 1.3 | 1.2 |
| Number of terminal functional groups | $H^1$-NMR | 1.85 | 1.96 |

To 100 weight parts of compound A1 were added 36 weight parts of Linearene 18 (product of Idemitsu Petrochemical) as (C) component and 1 weight part of MARK AO-50 (product of Adeka Argus Chemical) as antioxidant, and the mixture was hand-kneaded. On that occasion, the mixture was heated to about 70° C. for dissolving the antioxidant. After cooling the composition to room temperature, 13.2 weight parts, per 100 weight parts of (A) component, of LS-7250 (product of Shin-Etsu Chemical) as (D) component and 39 weight parts, per 100 weight parts of (A) component, of compound B1,which is a (B) component and has the structure shown below, were weighed and added to the above composition.

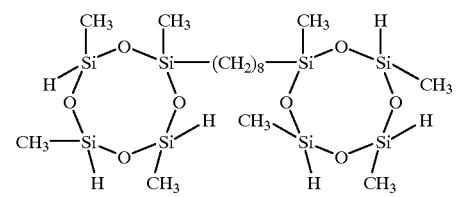

Compound B1

Further, 70 μl per 100 g of (A) component, of dimethyl maleate as storage stability improving agent and 100 μl, per 100 g of (A) component, of a bis(1,3-divinyl-1,1,3,3-tetramethyl-disiloxane)-platinum complex catalyst (17.9× $10^{-5}$ mmol/μl solution in xylene) as (E) component catalyst were measured, added and homogeneously mixed. Then, deaeration was curried out in a vacuum deaeration/stirring apparatus (product of Seetech) for 10 minutes. This formulation was filled into an aluminum mold lined with a teflon sheet and heated at 150° C. in a hot air drier for 30 minutes. The thus-obtained sheet-shaped cured product was punched by means of a die for minidumbbells and measured for tensile strength and subjected to gel fraction testing and heating loss testing by the methods mentioned above. The formulation and results are shown in Table 2.

TABLE 2

| | | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|---|---|
| (A) Component | Compound A1 | g | 100 | 100 | 100 | 100 | 100 | 100 | 100 | 100 | 100 |
| (B) Component | Compound B1 | g | 39 | 35 | 32 | 32 | 32 | 34 | 35 | | |
| | Compound B2 | g | | | | | | | | 82 | |
| | Compound B3 | g | | | | | | | | | 73 |
| (C) Component | Linearene 18[1)] | g | 36 | 36 | 36 | 36 | 36 | 36 | 36 | 36 | 36 |
| (D) Component | LS-7250[2)] | g | 13.2 | | | | | | | | |
| | 1,9-Decadiene | g | | 7.4 | | | | | | | |
| | LS-8180[2)] | g | | | 7.5 | | | | | | |
| | Neoallyl P-30M[3)] | g | | | | 7.5 | | | | | |
| | LS-8670[2)] | g | | | | | 7.5 | | | 10 | 15 |
| | Nisseki polybutadiene B-700[4)] | g | | | | | | 10 | | | |
| | Nisseki polybutadiene B-1000[4)] | g | | | | | | | 10 | | |
| (E) Component | Pt-vinylsiloxane complex | μl | 100 | 100 | 100 | 100 | 100 | 100 | 100 | 100 | 100 |
| Storage stability improver | Dimethyl maleate | μl | 70 | 70 | 70 | 70 | 70 | 70 | 70 | 70 | 70 |
| Antioxidant | MARK AO-50[5)] | g | 1 | 1 | 1 | 1 | 1 | 1 | 1 | 1 | 1 |
| | Viscosity[6)] | poise | — | — | — | — | 30 | — | — | 20 | 50 |
| Tensile characteristics | M30 | kgf/cm$^2$ | 2.6 | 2.6 | 2.9 | 2.4 | 3.2 | 3.5 | 3.6 | 1.8 | 3.7 |
| | Tmax | kgf/cm$^2$ | 7.0 | 4.4 | 7.0 | 4.7 | 4.9 | 5.1 | 6.3 | 3.7 | 7.6 |
| | Emax[7)] | % | 100 | 60 | 90 | 50 | 140 | 50 | 50 | 60 | 60 |

TABLE 2-continued

|  |  | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|---|
| Gel fraction[8] | % | 95 | 97 | 96 | 94 | 96 | 93 | 92 | 89 | 88 |
| Heating loss[9] | % | 0.8 | 0.8 | 0.7 | 0.7 | 0.8 | 0.8 | 0.7 | 1.7 | 1.8 |

[1] Product of Idemitsu Petrochemical.
[2] Product of Shin-Etsu Chemical
[3] Product of Daisoh.
[4] Product of Nippon Petrochemicals.
[5] Product of Adeka Argus chemical.
[6] Type E viscometer, 5 rpm, 23° C.
[7] Elongation at maximum strength development.
[8] 48 hours of immersion in toluene
[9] 7 days of exposure in a hot air drier at 150° C.

EXAMPLES 1-2 to 1-9

The procedure of Example 1-1 was followed except using, as (D) component, 1,9-decadiene, LS-8180 (product of Shin-Etsu Chemical), Neoallyl P-30M (product of Daisoh), Nisseki polybutadiene B-700 or B-1000 (product of Nippon Petrochemicals), as shown in Table 2, adjusting the addition amount of compound B1 as (B) component and using, as (B) component, B2 or B3, respectively having the structures shown below, besides 1.

Compound B2

$$CH_3-\underset{\underset{CH_3}{|}}{\overset{\overset{CH_3}{|}}{Si}}-O-\left(\underset{\underset{CH_3}{|}}{\overset{\overset{H}{|}}{Si}}-O\right)_6-\left(\underset{\underset{CH_3}{|}}{\overset{\overset{C_{18}H_{37}}{|}}{Si}}-O\right)_{1.5}-\left(\underset{\underset{CH_3}{|}}{\overset{\overset{C_8H_{17}}{|}}{Si}}-O\right)_{2.5}-\underset{\underset{CH_3}{|}}{\overset{\overset{CH_3}{|}}{Si}}-CH_3$$

Compound B3

$$CH_3-\underset{\underset{CH_3}{|}}{\overset{\overset{CH_3}{|}}{Si}}-O-\left(\underset{\underset{CH_3}{|}}{\overset{\overset{H}{|}}{Si}}-O\right)_{5.5}-\left(\underset{\underset{CH_3}{|}}{\overset{\overset{C_{13}H_{27}}{|}}{Si}}-O\right)_{2}-\underset{\underset{CH_3}{|}}{\overset{\overset{CH_3}{|}}{Si}}-CH_3$$

The specimens obtained were subjected to tensile testing, gel fraction testing and heating loss testing. The results are shown in Table 2. In Example 1-5, 1-8 and 1-9, the compositions were measured for composition viscosity by the method mentioned above using a type E viscometer. The formulations and results are shown in Table 2.

Comparative Example 1-1

Compound A1 was used as (A) component. To 100 weight parts of (A) component were added 50 weight parts of paraffin oil ("PS-32"; product of Idemitsu Kosan) as plasticizer and 1 weight part of MARK AO-50 (product of Adeka Argus Chemical) as antioxidant, and the mixture was hand-kneaded. On that occasion, the mixture was heated to about 70° C. for dissolving the antioxidant. After cooling the composition to room temperature, 9.3 weight parts, per 100 weight parts of (A) component, of compound B4, which has the structure shown below, was weighed and added, as (B) component, to the above composition.

Compound B4

$$CH_3-\underset{\underset{CH_3}{|}}{\overset{\overset{CH_3}{|}}{Si}}-O-\left(\underset{\underset{CH_3}{|}}{\overset{\overset{H}{|}}{Si}}-O\right)_6-\left(\underset{\underset{CH_3}{|}}{\overset{\overset{CH_2-\overset{C_6H_5}{\underset{|}{CH}}-CH_3}{|}}{Si}}-O\right)_{1.5}-\underset{\underset{CH_3}{|}}{\overset{\overset{CH_3}{|}}{Si}}-CH_3$$

Further, 70μl, per 100 g of (A) component, of dimethyl maleate as storage stability improving agent and 100μl, per 100 g of (A) component, of a bis(1,3-divinyl-1,1,3,3-tetramethyldisiloxane)-platinum complex catalyst (17.9× $10^{-5}$ mmol/μl solution in xylene) as (E) component catalyst were measured, added and homogeneously mixed. Then, deaeration was curried out in a vacuum deaeration/stirring apparatus (product of Seetech) for 10 minutes. This formulation was measured for viscosity by the above-mentioned method using a type E viscometer and filled into an aluminum mold lined with a teflon sheet and heated at 150° C. in a hot air drier for 30 minutes. The thus-obtained sheet-shaped cured product was punched by means of a die for minidumbbells. Then, measuring tensile strength, gel fraction testing and heating loss testing by the methods mentioned above were curried out. The compounding formulation and results are shown in Table 3.

TABLE 3

|  |  |  | Compar. Ex. 1-1 | Compar. Ex. 1-2 |
|---|---|---|---|---|
| (A) Component | Compound A1 | g | 100 | 100 |
| (B) Component | Compound B4 | g | 9.3 |  |
|  | Compound B5 | g |  | 27 |
| Plasticizer | PS-32[1] | g | 50 |  |
| (C) Component | Linearene 18[2] | g |  | 36 |
| (E) Component | Pt-vinylsiloxane complex | μl | 100 | 100 |
| Storage stability improver | Dimethyl maleate | μl | 70 | 70 |
| Antioxidant | MARK AO-50[3] | g | 1 | 1 |
|  | Viscosity[4] | poise | 780 | 70 |
| Tensile characteristics | M30 | kgf/cm² | 3.6 | 1.3 |
|  | Tmax | kgf/cm² | 3.6 | 3.4 |
|  | Emax[5] | % | 30 | 100 |

TABLE 3-continued

|  |  | Compar. Ex. 1-1 | Compar. Ex. 1-2 |
|---|---|---|---|
| Gel fraction[6] | % | 79 | 93 |
| Heating loss[7] | % | 15.6 | 0.9 |

[1] Product of Idemitsu Kosan
[2] Product of Idemitsu Petrochemical.
[3] Product of Adeka Argus chemical.
[4] Type E viscometer, 5 rpm, 23° C.
[5] Elongation at maximum strength development.
[6] 48 hours of immersion in toluene
[7] 7days of exposure in a hot air drier at 150° C.

Comparative Example 1-2

The procedure of Comparative Example 1-1 was followed except using 36 weight parts of Linearene 18 (product of Idemitsu Petrochemical ) and 27 weight parts of compound B5, which is a (B) component and has the structure shown below, were used, From the results shown in Table 2 and Table 3, it is evident that, as compared with the case of using a plasticizer, the compositions of the present invention can be designed so as to have a low viscosity and can give cured products having higher mechanical strength characteristics, a higher gel fraction and a smaller heating loss. It is also evident that, as compared with the case of using (C) component as a diluent without adding any (D) component, the compositions of the present invention, even when the viscosity is lower, can give cured products higher in mechanical strength.

In the following, examples in which an (A) component having a higher molecular weight was used or the addition amount of (C) component was varied are shown.

EXAMPLES 2-1 to 2-3

The procedure of Example 1-1 was followed while modifying the addition amount of (C) component Linearene 18 (product of Idemitsu Petrochemical) and the addition amount of (B) component compound B1, and tensile testing, gel fraction testing and heating loss testing were curried out. A mixture composed of (A) component and (C) component alone was measured for viscosity by the above-mentioned method using a type E viscometer. The formulations and results are shown in Table 4.

TABLE 4

|  |  |  | Ex. 2-1 | Ex. 2-2 | Ex. 2-3 | Ex. 2-4 | Ex. 2-5 | Ex. 2-6 | Ex. 2-7 | Ex. 2-8 |
|---|---|---|---|---|---|---|---|---|---|---|
| (A) Component | Compound A1 | g | 100 | 100 | 100 |  |  |  |  |  |
|  | Compound A2 | g |  |  |  | 100 | 100 | 100 | 100 | 100 |
| (B) Component | Compound B1 | g | 18 | 25 | 34 | 19 | 31 | 38 | 43 | 55 |
| (C) Component | Linearene 18[1] | g | 18 | 27 | 36 | 20 | 30 | 40 | 49 | 75 |
| (D) Component | Nisseki polybutadiene B-700[2] | g | 4 | 6 | 10 | 6 | 12 | 14 | 14 | 14 |
| (E) Component | Pt-vinylsiloxane complex | μl | 100 | 100 | 100 | 55 | 55 | 55 | 55 | 55 |
| Storage stability improver | Dimethyl maleate | μl | 70 | 70 | 70 | 37 | 37 | 37 | 37 | 37 |
| Antioxidant | MARK AO-50[3] | g | 1 | 1 | 1 | 1 | 1 | 1 | 1 | 1 |
|  | Viscosity[4] | poise | 410 | 160 | 70 | 770 | 270 | 120 | 60 | 60 |
| Tensile characteristics | M30 | kgf/cm² | 2.7 | 2.7 | 3.5 | 2.3 | 3.2 | 3.4 | 2.7 | 2.1 |
|  | Tmax | kgf/cm² | 8.7 | 5.3 | 5.1 | 18.3 | 12.4 | 12.4 | 7.2 | 5.1 |
|  | Emax[5] | % | 120 | 70 | 50 | 170 | 90 | 80 | 70 | 50 |
|  | Gel fraction[6] | % | 95 | 94 | 93 | 94 | 93 | 92 | 89 | 82 |
|  | Heating loss[7] | % | 0.6 | 0.7 | 0.8 | 0.9 | 0.9 | 1.0 | 0.9 | 1.3 |

[1] Product of Idemitsu Petrochemical.
[2] Product of Nippon Petrochemicals.
[3] Product of Adeka Argus chemical.
[4] Viscosity of (A) + (C) Component (The viscosity of the composition is much lower). Type E viscometer, 5 rpm, 23° C.
[5] Elongation at maximum strength development.
[6] 48 hours of immersion in toluene
[7] 7 days of exposure in a hot air drier at 150° C.

Compound B5

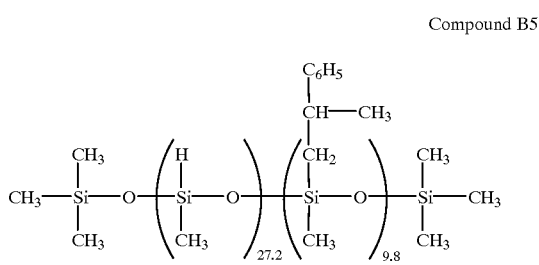

and tensile testing, gel fraction testing and heating loss testing were curried out. The corresponding composition was measured for viscosity by the method mentioned above. The results are shown in Table 3.

EXAMPLES 2-4 to 2-8

The procedure of Examples 2-1 to 2-3 was followed except that compound A2 was used as (A) component (the analytical values being shown in Table 1), and tensile testing, gel fraction testing and heating loss testing were curried out. The formulations and results are shown in Table 4.

As shown, it is evident that even when the (A) component has a larger molecular weight and/or the addition amount of (C) component is increased, the high gel fraction and low heating loss can stand together although a slight decrease in gel fraction is observed.

In the following, examples are shown in which an inorganic filler was used in the composition of the present invention.

EXAMPLE 3-1

Compound A1 was used as (A) component. To 100 weight parts of compound (A) were added 36 weight parts of Linearene 18 (product of Idemitsu Petrochemical) as (C) component and 1 weight part of MARK AO-50 (product of Adeka Argus Chemical) as antioxidant, and the mixture was hand-kneaded. On that occasion, the mixture was heated to about 70° C. for dissolving the antioxidant. After cooling said composition to room temperature, 75 weight parts, per 100 weight parts of (A) component, of Fuselex ZA-40C (product of Tatsumori) as inorganic filler and the resulting mixture was hand-mixed and then kneaded up by passing through a three-roll paint mill (ceramic roll; product of Kodaira Seisakusho) three times, to give a uniform composition. 10.5 weight parts, per 100 weight parts of (A) component, of LS-8670 (product of Shin-Etsu Chemical) as (D) component and 37 weight parts, per 100 weight parts of (A) component, of compound B1 as (B) component were weighed and added to the above uniform composition, followed by hand mixing. Further, 70$\mu$l, per 100 g of (A) component, of dimethyl maleate as storage stability improving agent and 100 $\mu$l, per 100 g of (A) component, of a bis(1,3-divinyl-1,1,3,3-tetramethyldisiloxane)-platinum complex catalyst (17.9×10$^{-5}$ mmol/$\mu$l solution in xylene) as (E) component catalyst were measured, added and homogeneously mixed. Then, deaeration was curried out in a vacuum deaeration/stirring apparatus (product of Seetech) for 10 minutes. This formulation was filled into an aluminum mold lined with a teflon sheet and heated at 150° C. in a hot air drier for 30 minutes. The thus-obtained sheet-shaped cured product was punched by means of a die for minidumbbells. Then, measuring tensile strength, gel fraction testing and heating loss testing by the methods mentioned above were curried out. The formulation and results are shown in Table 5.

EXAMPLES 3-2 and 3-3

The procedure of Example 3-1 was followed using compound B3 in lieu of compound B1 as (B) component or Nisseki polybutadiene B-700 (product of Nippon Petrochemicals) in lieu of LS-8670 as (D) component. Then, measuring tensile strength, gel fraction testing and heating loss testing by the methods mentioned above were curried out. The formulations and results are shown in Table 5.

Comparative Example 3-1

Compound A1 was used as (A) component. To 100 weight parts of (A) component were added 50 weight parts of paraffin oil ("PS-32"; product of Idemitsu Kosan) as plasticizer and 1 weight part of MARK AO-50 (product of Adeka Argus Chemical) as antioixdant, and the mixture was hand-kneaded. On that occasion, the mixture was heated to about 70° C. for dissolving the antioxidant. After cooling the composition to room temperature, 100 weight parts, per 100 weight parts of (A) component, of Fuselex ZA-40C (product of Tatsumori) as inorganic filler and this mixture was hand-mixed and then kneaded up by passing through a three-roll paint mill (ceramic roll; product of Kodaira Seisakusho) three times, to give a uniform composition. The compound B4 (9.3 weight parts per 100 weight of (A) component) as (B) component was weighed and added to said uniform composition, followed by hand mixing. Further, 70 $\mu$l per 100 g of (A) component, of dimethyl maleate as storage stability improving agent and 100 $\mu$l, per 100 g of (A) component, of a bis(1,3-divinyl-1,1,3,3-tetramethyldisiloxane)-platinum complex catalyst (17.9×10$^{-5}$ mmol/$\mu$l solution in xylene) as (E) component catalyst were measured, added and homogeneously mixed. Then, deaeration was curried out in a vacuum deaeration/stirring

TABLE 5

|  |  |  | Ex. 3-1 | Ex. 3-2 | Ex. 3-3 | Compar. Ex. 3-1 | Compar. Ex. 3-2 |
|---|---|---|---|---|---|---|---|
| (A) Component | Compound A | g | 100 | 100 | 100 | 100 | 100 |
| (B) Component | Compound B1 | g | 37 | 36 |  |  |  |
|  | Compound B3 | g |  |  | 73 |  |  |
|  | Compound B5 | g |  |  |  |  | 27 |
|  | Compound B4 | g |  |  |  | 9.3 |  |
| (C) Component | Linearene 18[1] | g | 36 | 36 | 36 |  | 36 |
| Plasticizer | PS-32[2] | g |  |  |  | 50 |  |
| (D) Component | LS-8670[3] | g | 10.5 |  | 15 |  |  |
|  | Nisseki polybutadiene B-700[4] | g |  | 12 |  |  |  |
| (E) Component | Pt-vinylsiloxane complex | $\mu$l | 100 | 100 | 100 | 100 | 100 |
| Inorganic filler | Fuselex ZA-40C[5] | g | 75 | 75 | 75 | 100 | 75 |
| Storage stability improver | Dimethyl maleate | $\mu$l | 70 | 70 | 70 | 70 | 70 |
| Antioxidant | MARK AO-50[6] | g | 1 | 1 | 1 | 1 | 1 |
|  | Fluidity[7] |  | ⊚ | ⊚ | ⊚ | Δ | ○ |
| Tensile characteristics | M30 | kgf/cm$^2$ | 16.3 | 11.2 | 10.5 | 4.8 | insufficient curing |
|  | Tmax | kgf/cm$^2$ | 30.1 | 20.0 | 18.8 | 11.0 |  |
|  | Emax[8] | % | 60 | 50 | 50 | 70 |  |
| Gel fraction |  | % | 97 | 96 | 93 | — |  |
| Heating loss[10] |  | % | 0.8 | 1.0 | 0.9 | 17 |  |

[1]Product of Idemitsu Petrochemical.
[2]Product of Idemitsu Kosan
[3]Product of Shin-Etsu Chemical
[4]Product of Nippon Petrochemicals.
[5]Product of Adeka Argus chemical.
[6]Product of Tatsumori
[7] ⊚ : good, ○ : relatively good, Δ: somewhat difficult to flow
[7]Elongation at maximum strength development.
[8]48 hours of immersion in toluene
[9]7 days of exposure in a hot air drier at 150° C.

apparatus (product of Seetech) for 10 minutes. The resulting formulation was filled into an aluminum mold lined with a teflon sheet and heated at 150° C. in a hot air drier for 30 minutes. The thus-obtained sheet-shaped cured product was punched by means of a die for minidumbbells. Then, measuring tensile strength, gel fraction testing and heating loss testing by the methods mentioned above were curried out. The formulation and results are shown in Table 5.

Comparative Example 3-2

Compound A1 was used as (A) component. To 100 weight parts of (A) component were added 36 weight parts of Linearene 18 (product of Idemitsu Petrochemical) as (C) component and 1 weight part of MARK AO-50 (product of Adeka Argus Chemical) as antioxidant, and the mixture was hand-kneaded. On that occasion, the mixture was heated to about 70° C. for dissolving the antioxidant. After cooling the composition to room temperature, 75 weight parts, per 100 weight parts of (A) component, of Fuselex ZA-40C (product of Tatsumori) as inorganic filler, the resulting mixture was hand-mixed and then kneaded up by passing through a three-roll paint mill (ceramic roll; product of Kodaira Seisakusho) three times, to give a uniform composition. The compound B5 (27 weight parts per 100 weight of (A) component) as (B) component was weighed and added to In the following, some typical excellent characteristics of the rubber-like elastomers obtained by curing some compositions prepared according to the present invention are shown. In an heat resistance test, the percent changes in physical characteristics was measured after exposing in a hot air drier at 150° C. for 600 hours. In a water resistance test, the percent changes in physical characteristics was measured after immersing in warm water at 80° C. for a month. In a water absorption test, the percent weight gains was measured after exposing to pressure cooker test conditions (121° C. in saturated steam) for 600 hours. In a chemical resistance test, the percent changes in physical characteristics was measured after immersing in concentrated hydrochloric acid or 20% aqueous caustic soda solution at room temperature for a month. The specimens used were the minidumbbells obtained in Examples 1-5 and 1-6. In the above water resistance test and water absorption measurement, the specimens taken out of the test baths were wiped with filter paper to remove the water on the surface and then subjected to tensile testing or weighing. In the chemical resistance test, the specimens taken out of the test baths were washed once with water, further immersed in methanol, then wiped with filter paper and submitted to tensile testing and weighing. The results are shown in Table 6.

TABLE 6

| Physical characteristic | Test conditions | Example 1-6 | | | | Example 1-6 | | | |
| --- | --- | --- | --- | --- | --- | --- | --- | --- | --- |
| | | M30 (%) | Tmax (%) | Emax (%) | Weight change (%) | M30 (%) | Tmax (%) | Emax (%) | Weight change (%) |
| Heat resistance | 150° C. × 600 hours | 170 | 150 | 80 | −2 | 160 | 140 | 90 | −2 |
| Water resistance | 80° C. warm water × 1 month | 120 | 130 | 110 | 0 | 100 | 110 | 110 | 0 |
| Water absorption | 121° C., 2 atm. × 600 hours | | | | −1 | | | | −1 |
| Acid resistance | conc. HCl × 1 month | 110 | 110 | 100 | 1 | 100 | 100 | 110 | 0 |
| Alkali resistance | 20% NaOH aq. × 1 month | 100 | 120 | 110 | 0 | 90 | 110 | 120 | 0 | said uniform composition, followed by hand mixing. Further, 70 µl per 100 g of (A) component, of dimethyl maleate as storage stability improving agent and 100 µl per 100 g of (A) component, of a bis(1,3-divinyl-1,1,3,3-tetramethyldisiloxane)-platinum complex catalyst (17.9× $10^{-5}$ mmol/µl solution in xylene) as (E) component catalyst were measured, added and homogeneously mixed. Then, deaeration was curried out in a vacuum deaeration/stirring apparatus (product of Seetech) for 10 minutes. The resulting formulation was filled into an aluminum mold lined with a teflon sheet and heated at 150° C. in a hot air drier for 30 minutes. However, the formulation separated into two phases and failed to give a uniformly cured product.

As the above results indicate, the viscosity of a composition containing an inorganic filler is difficult to reduce by using a plasticizer, and cured products obtained from such composition are weak in mechanical strength and naturally show a low gel fraction and a great heating loss. Further, while a (C) component is used as a diluent, the (B) component which can be used has poor compatibility with the (A) component and/or (C) component, so that, without adding the (D) component, cases may occur where no cured products can be obtained, as in Comparative Example 3-2. On the contrary, as is evident in Examples 3-1 to 3-3, that the compositions according to the present invention are low in viscosity and can provide cured products excellent in mechanical strength and showing a high gel fraction and a small heating loss.

Furthermore, the measured values of water vapor permeability and volume resistivity are shown in Table 7. The water vapor permeability was measured according to JIS Z 0208 and the volume resistivity according to JIS K 6911.

TABLE 7

| | | Ex. 1–5 | Ex. 1–6 |
| --- | --- | --- | --- |
| Water vapor permeability | g/m².24 hr(sample thickness) | 1.4(1.7 mm) | 2.9(1.8 mm) |
| Volume resistivity | Ω.cm | $2.7 \times 10^{17}$ | $2.1 \times 10^{17}$ |

Thus, according to the present invention, it is possible to secure good fluidity and workability before curing and, after curing, obtain cured products and rubber-like elastomers having good mechanical characteristics, a high gel fraction and a small heating loss. The rubber-like elastomers obtained are excellent in heat resistance, water resistance, chemical resistance and other durability characteristics owing to the saturated hydrocarbon polymer skeleton of component (A) and have also characteristics such as insulation properties and low water vapor permeability.

Industrial Applicability

The composition of the present invention makes it possible to have a technology of viscosity reduction for improving the workability of curable compositions containing, as the main component, a saturated hydrocarbon polymer, typically a curable isobutylene polymer, by utilizing the hydrosilylation reaction, without impairing the excellent characteristics derivable said compositions. Specifically, improvements have been brought about in the prevention of the marked decreases in reliability and mechanical characteristics due to elution, blooming or evaporation of plasticizer components, which are inevitable when conventional nonreactive plasticizers are used, through the use, as diluent, of a compound capable of reacting with a SiH-containing compound to serve as a curing agent in said composition for integrating the diluent itself into the crosslink structure. If a single diluent is used in that case, the range of curing agents which can be used is limited and, as a result, the composition may undergo phase separation in the step of curing, resulting in insufficient curing.

By combinedly using a compound having one alkenyl group within the molecule as a diluent and a compound having at least two alkenyl groups within the molecule, the present invention could have markedly relaxed the restriction on SiH-containing compounds which are curing agents possibly becoming a cause of said insufficient curing and, as a result, has made it possible to obtain thoroughly uniform cured products in spite of the low viscosity of the composition. Specifically, it has become possible to use, as the SiH-containing compound, a compound containing a relatively small number of SiH groups, for example about 5, and thus facilitating securing of compatibility with the main component or dispersion stability. As a result, it has become possible to secure the compatibility among the components in the composition and the dispersion stability within a wide range of selection.

What is claimed is:

1. A curable composition which comprises the following components (A) to (E) as essential components:
(A) a saturated hydrocarbon polymer having more than one alkenyl groups capable of being hydrosilylated, on average, in each molecule and having a molecular weight of 2,000 to 50,000,
(B) a component comprising a compound containing more than two silicon atom-bound hydrogen atoms, on average, in each molecule,
(C) a compound having, within the molecule, one alkenyl group capable of being hydrosilylated,
(D) a compound having, within the molecule, at least two alkenyl groups capable of being hydrosilylated and having a molecular weight less than 2,000, and
(E) a hydrosilylation catalyst.

2. The curable composition according to claim 1, wherein said (A) component is an isobutylene polymer having a molecular weight of 2,000 to 50,000.

3. The curable composition according to claim 1, wherein the alkenyl group within said (A) component is located at a molecular terminus.

4. The curable composition according to claim 1, wherein said (B) component is a polyorganohydrogen-siloxane containing, on average, more than two silicon atom-bound hydrogen atoms per molecule.

5. The curable composition according to claim 1, wherein the alkenyl-containing compound, namely said (C) component, has a molecular weight of not more than 400.

6. The curable composition according to claim 1, wherein the alkenyl-containing compound, namely said (C) component, is an α-olefin containing 8 to 20 carbon atoms.

7. The curable composition according to claim 1, wherein the total amount, in mole ratio, of silicon atom-bound hydrogen atoms in the (B) component is 0.8 to 5 equivalents relative to the total amount of alkenyl groups capable of being hydrosilylated in the (A), (C) and (D) components, the (C) component amounts to 1 to 200 parts by weight per 100 parts by weight of the (A) component, and the (D) component amounts to 0.5 to 50 parts by weight per 100 parts by weight of the (A) component.

8. The curable composition according to claim 2, wherein the alkenyl group within said (A) component is located at a molecular terminus.

9. The curable composition according to claim 2, wherein said (B) component is a polyorganohydrogen-siloxane containing, on average, more than two silicon atom-bound hydrogen atoms per molecule.

10. The curable composition according to claim 3, wherein said (B) component is a polyorganohydrogen-siloxane containing, on average, more than two silicon atom-bound hydrogen atoms per molecule.

11. The curable composition according to claim 2, wherein the alkenyl-containing compound, namely said (C) component, has a molecular weight of not more than 400.

12. The curable composition according to claim 3, wherein the alkenyl-containing compound, namely said (C) component, has a molecular weight of not more than 400.

13. The curable composition according to claim 4, wherein the alkenyl-containing compound, namely said (C) component, has a molecular weight of not more than 400.

14. The curable composition according to claim 2, wherein the alkenyl-containing compound, namely said (C) component, is an α-olefin containing 8 to 20 carbon atoms.

15. The curable composition according to claim 3, wherein the alkenyl-containing compound, namely said (C) component, is an α-olefin containing 8 to 20 carbon atoms.

16. The curable composition according to claim 4, wherein the alkenyl-containing compound, namely said (C) component, is an α-olefin containing 8 to 20 carbon atoms.

17. The curable composition according to claim 5, wherein the alkenyl-containing compound, namely said (C) component, is an α-olefin containing 8 to 20 carbon atoms.

18. The curable composition according to claim 2, wherein the total amount, in mole ratio, of silicon atom-bound hydrogen atoms in the (B) component is 0.8 to 5 equivalents relative to the total amount of alkenyl groups capable of being hydrosilylated in the (A), (C) and (D) components, the (C) component amounts to 1 to 200 parts by weight per 100 parts by weight of the (A) component, and the (D) component amounts to 0.5 to 50 parts by weight per 100 parts by weight of the (A) component.

19. The curable composition according to claim 3, wherein the total amount, in mole ratio, of silicon atom-bound hydrogen atoms in the (B) component is 0.8 to 5 equivalents relative to the total amount of alkenyl groups capable of being hydrosilylated in the (A), (C) and (D) components, the (C) component amounts to 1 to 200 parts by weight per 100 parts by weight of the (A) component, and the (D) component amounts to 0.5 to 50 parts by weight per 100 parts by weight of the (A) component.

20. The curable composition according to claim 3, wherein the total amount, in mole ratio, of silicon atom-bound hydrogen atoms in the (B) component is 0.8 to 5 equivalents relative to the total amount of alkenyl groups capable of being hydrosilylated in the (A), (C) and (D) components, the (C) component amounts to 1 to 200 parts by weight per 100 parts by weight of the (A) component, and the (D) component amounts to 0.5 to 50 parts by weight per 100 parts by weight of the (A) component.

* * * * *